Figure 1:
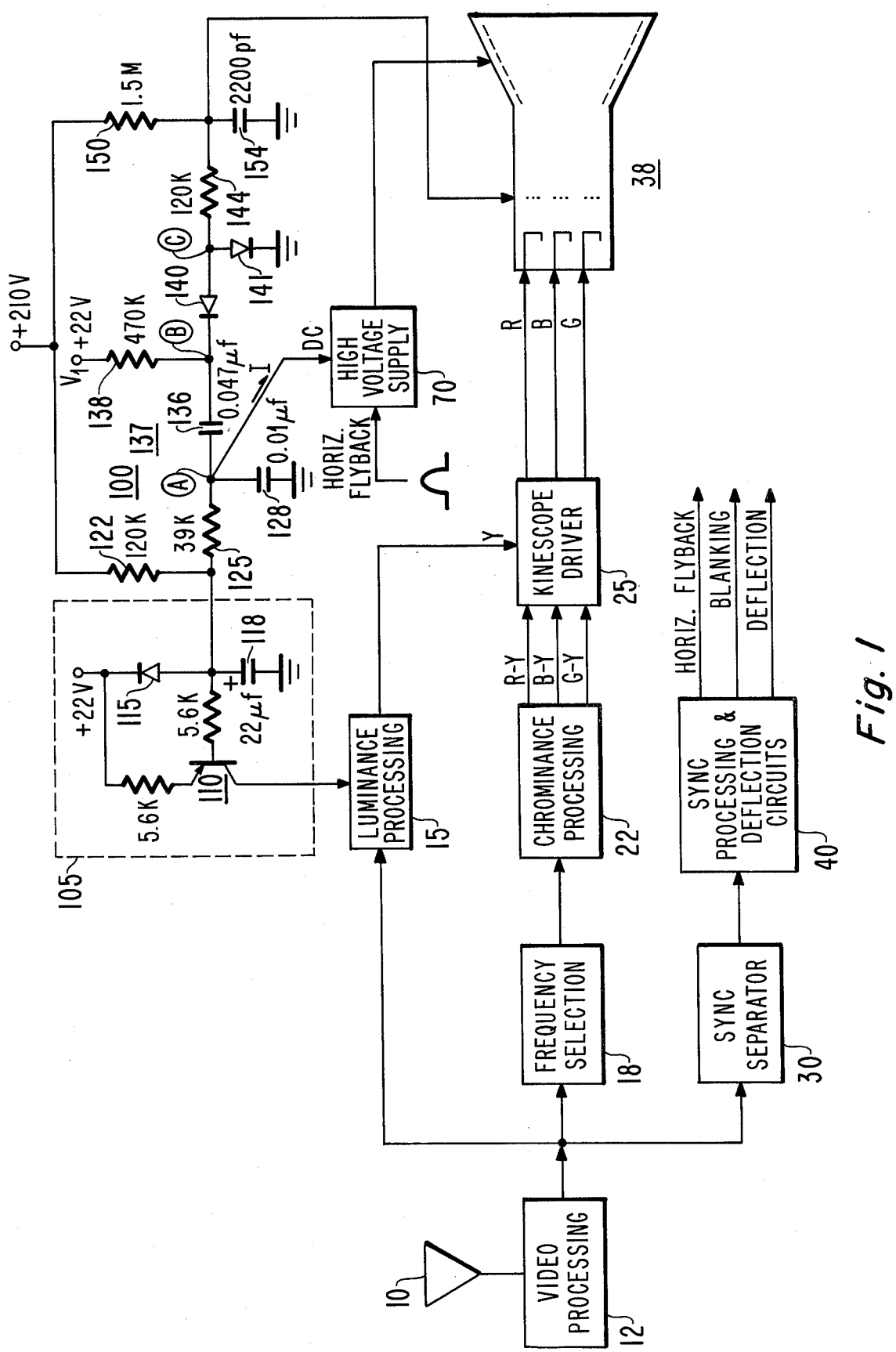

United States Patent [19]

Serafini

[11] 4,079,424
[45] Mar. 14, 1978

[54] AUTOMATIC TRANSIENT BEAM CURRENT LIMITER

[75] Inventor: Joseph James Serafini, Indianapolis, Ind.

[73] Assignee: RCA Corporation, New York, N.Y.

[21] Appl. No.: 766,373

[22] Filed: Feb. 7, 1977

[51] Int. Cl.² .................. H04N 5/68; H04N 5/21
[52] U.S. Cl. ............................................. 358/243
[58] Field of Search ........................ 358/243, 168

[56] References Cited

U.S. PATENT DOCUMENTS 3,980,822  9/1976  Suzuki et al. .................. 358/168

Primary Examiner—Robert L. Richardson
Attorney, Agent, or Firm—Eugene M. Whitacre; William H. Meagher; Ronald H. Kurdyla

[57] ABSTRACT

Apparatus for reducing transient beam current conduction of a kinescope of a television receiver. Means are included for providing control signals representative of transient increases in beam current of predetermined duration. The magnitude of successively recurring control signals is altered (e.g., reduced) in progressive increments. The altered magnitude control signals are coupled to the kinescope to reduce the conduction of the kinescope in accordance with the magnitude of the control signals, so that the visually perceived effect of the operation of the apparatus is less pronounced.

11 Claims, 6 Drawing Figures

AUTOMATIC TRANSIENT BEAM CURRENT LIMITER

This invention relates to apparatus for limiting transient electron beam currents drawn by an image reproducing device, such as a kinescope of a television receiver.

Excessive beam current can cause a receiver to produce a degraded image. In this regard, excessive beam currents can cause degradation of the performance of the deflection system of the receiver, electron beam spot defocussing and picture blooming. High beam currents can also exceed the safe operating current capability of the kinescope, possibly causing damage to the kinescope and associated circuit components.

Automatic beam current limiter or automatic brightness limiter circuits responsive to average beam current levels are known. These circuits typically respond to increased beam current levels occurring at a rate equal to or greater than a vertical image scanning rate of the kinescope. The average responding circuits do not respond to transient increases in beam current levels occurring for several horizontal image lines of a vertical scanning interval, for example.

A disadvantage of average responding automatic beam current limiter circuit is that these circuits are essentially insensitive to transient or peak increases in beam current of significantly shorter duration compared to increases in average beam current. Transient increases in beam current levels can be attributable to the information content of a received video signal representative of black-to-white image transitions occurring in one or more succeeding vertical image scanning intervals. Excessive transient beam currents can also occur as a result of transients produced when switching from one channel of the receiver to another. In any case, excessive transient beam current levels can have an adverse effect upon receiver circuits (e.g., deflection circuits) which may be sensitive to high levels of transient current. One type of automatic beam current (or brightness) limiter comprising both average and transient responsive circuits is shown in U.S. Pat. No. 3,980,822.

It is desirable for transient beam current limiter apparatus to operate such that the visually perceived effect of the operation of the apparatus is reduced to an acceptable minimum. It is also desirable for such apparatus to be readily adaptable for use with an average responding beam current limiter circuit.

In a television system including an image reproducing device for reproducing an image in response to image representative video signals, apparatus in accordance with the present invention comprises a sensing circuit for deriving a signal representative of the magnitude of current drawn by the image reproducing device, and a control network. The control network is coupled to the sensing circuit for providing control control impulses representative of transient increases in current of predetermined duration drawn by the image reproducing device. The control impulses are coupled to the image reproducing device for reducing the current conduction of the image reproducing device in accordance with the magnitude of the control impulses. Means are also coupled to the control network, and effective when the impulses appear in a recurring sequence, for altering the magnitude, in progressive increments, of successive ones of the coupled control impulses appearing in sequence.

In the drawing:
FIG. 1 shows, partially in block diagram form and partially in schematic circuit diagram form, a general arrangement of a color television receiver employing apparatus constructed in accordance with the present invention; and FIGS. 2-6 show graphical representations useful in understanding the operation of the circuit of FIG. 1.

Referring now to FIG. 1, there is shown a color television receiver including a video processing unit 12 for receiving radio frequency signals from an antenna 10 and for translating these signals through intermediate frequency amplifying and detecting stages (not shown) to provide a composite video signal. The composite video signal comprises luminance, chrominance and synchronization components.

The composite video output signal from video processing unit 12 is amplified and otherwise processed by a luminance signal processing unit 15 to provide a luminance output signal Y. A frequency selection unit 18 selectively couples the chrominance component of the composite video signal to a chrominance signal processing unit 22 to derive R-Y, B-Y and G-Y color difference signals. The color difference signals are coupled to respective inputs of a kinescope driver stage 25. Kinescope driver stage 25 combines the color difference signals with the luminance output signal, Y, to form R, B and G color signals which are applied to cathode electrodes of a kinescope 38.

A sync separator 30 serves to separate the synchronization (sync) component from the composite video signal to provide periodic line sync pulses. The periodic sync pulses are further processed by sync processing and deflection circuits 40 to provide periodic horizontal flyback and horizontal and vertical blanking and deflection signals as known.

A high voltage supply 70 (e.g., a voltage tripler) provides high operating voltages for focus (not shown) and ultor electrodes of kinescope 38 in response to positive periodic horizontal flyback pulses occurring during horizontal retrace scanning intervals. A bias voltage for control grids of kinescope 38 is provided from a network including a source of positive operating voltage (e.g., +210 volts) together with a voltage divider including bias resistors 150, 144 and a normally conductive diode 141 arranged in series. A high frequency filter capacitor 154 coupled to the junction of bias resistors 144 and 150 filters video frequency signals which may appear at the control grids of kinescope 38.

Automatic beam current limiting is provided by a circuit 105 responsive to excessive average beam currents, and by a circuit 100 responsive to excessive transient beam currents.

Average beam current limiter circuit 105 is described in copending U.S. Patent application Ser. No. 715,861, entitled "Automatic Beam Current Limiter" of M. N. Norman, filed Aug. 19, 1976, and assigned to the same assignee as the present invention. Briefly, a current supply including a positive voltage source (+210 volts) and a current determining resistor 122 is associated with the operation of average beam limiter 105 (and with transient beam limiter 100 as will be explained). Current flowing in resistor 122 includes a component I representative of the beam current demand of kinescope 38. The current I flows in a path including resistors 122 and 125 to a D.C. input of high voltage unit 70, and is sometimes referred to as a resupply current (i.e., a current supplied via the high voltage unit to recharge or resupply the ultor electrode voltage of the kinescope when depleted as a result of conduction). A voltage appearing across an average responding filter capacitor 118 of circuit 105 is representative of the magnitude of average kinescope beam current demand when above a predetermined level (e.g., 1.5 milliamperes). Below this level, in a normal operating condition, the voltage on capacitor 118 and therefore the base voltage of a control transistor 110 are clamped to a fixed level by means of clamp diode 115, so that transistor 110 is non-conductive. When the predetermined level is exceeded, clamp diode 115 is rendered non-conductive and transistor 110 is forward biased into conduction in response to the voltage then appearing on capacitor 118. Transistor 110 then provides an output control voltage at its collector proportional to the amount by which the predetermined level is exceeded. In this example, the collector control voltage is coupled to luminance processing unit 15 to reduce the D.C. content of the luminance signal processed by unit 15 in a direction to cause kinescope 38 to conduct proportionally less average beam current.

Referring now to transient beam current limiter circuit 100, a voltage determining resistor is coupled between resistor 122 and a circuit point A for developing a voltage $V_A$ at point A, as will be explained. A capacitor 128 serves to filter signal components occurring at a horizontal line scanning frequency (e.g., 15,734 Hz according to United States standards) from voltage $V_A$.

A voltage $V_B$ appearing at a circuit point B between an A.C. coupling capacitor 136 and a normally non-conductive threshold conduction diode 140 is determined by a network 137 including a current determining resistor 138 and a source of positive voltage (+22 volts) under normal conditions, and also by the voltage $V_A$ when circuit 100 operates in a beam current limiting mode. Under normal conditions, diode 140 and diode 141 are reverse biased and forward biased, respectively, so that voltages of the order of +22 volts and +0.6 volts appear at circuit points B and C, respectively, and a normal control grid bias voltage of the order of +16 volts appears at the junction of bias resistors 144 and 150.

In this example, circuit 100 is activated in the presence of excessive transient beam currents of a time duration less than a vertical scanning interval (of the order of 16.5 milliseconds according to United States television system standards) but greater than a horizontal line scanning interval. In the illustrated circuit embodiment with the values shown, circuit 100 is capable of responding to transient beam currents representing white or bright image information of between 0.5 milliseconds and 5 milliseconds duration, for example. Excessive beam currents of a duration substantially equal to or greater than a vertical scanning interval represent average beam currents in this example and are limited by average responding circuit 105 as noted previously.

A transient (resupply) current demand represented by current I, having a time duration within the limits mentioned above, will cause a proportional voltage transient or impulse to appear across resistor 125. If current I is of sufficient peak magnitude, a negative voltage $V_A$ proportional to current I is produced at point A. This can occur if transient current I exhibits a peak amplitude of a value such that voltage $V_A$ is developed according to the expression:

$$V_A = V_{118} - (I)(R_{125})$$

where
$V_{118}$ is the voltage then appearing on capacitor 118,
I is the magnitude of transient current I, and
$R_{125}$ is the value of resistor 125.

Illustratively, and assuming a beam current condition such that diode 115 is conductive whereby average beam current limiter 105 is not activated, a peak amplitude of transient current I of 1.75 milliamperes will produce a negative transient voltage $V_A$ with a peak amplitude of −45 volts. This negative transient voltage is capacitively coupled to circuit point B. A negative transient voltage $V_B$ (see FIG. 3) then appearing at point B with sufficient magnitude serves to forward bias diode 140 into conduction and reverse bias diode 141 out of conduction. The negative transient voltage $V_B$ is coupled via conductive diode 140 and resistor 144 to the junction of bias resistors 144 and 150 so that a negative bias voltage is developed thereat. This bias voltage is in a direction to reduce the bias potential of the control grids of kinescope 38 and thereby reduce the beam current conduction of kinescope 38.

In the absence of network 137, the operation of circuit 100 can produce unwanted, perceptible vertical gray-scale shading (luminance distortion) of a reproduced image. This condition can arise, for example, in the presence of recurring video information containing a white or bright vertical image segment of a duration within the response time sensitivity of circuit 100, following a black or relatively darker vertical image segment, as discussed below in conjunction with FIGS. 2–6. The waveforms shown in FIGS. 3–6 are exaggerated somewhat in the interest of clarity.

Figure 2:
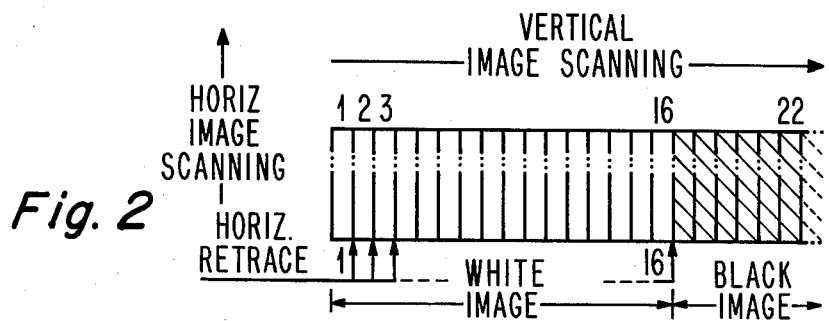
Figure 6:
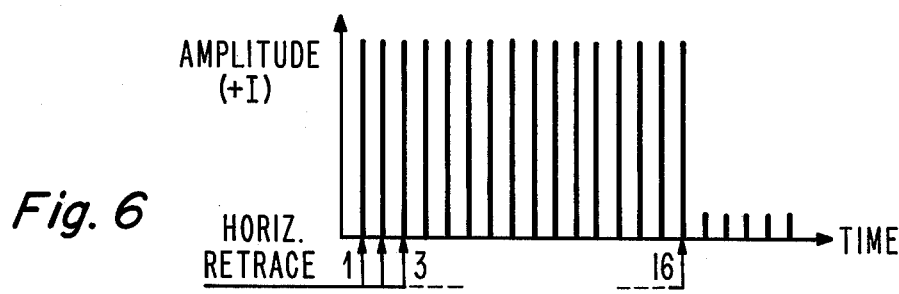

FIG. 2 represents a portion of a vertical image segment containing a plurality of uniformly white or bright horizontal image lines nominally designated as lines 1–16 following a relatively darker image segment (not shown), and a black image portion comprising a plurality of horizontal lines 17–22 (and so on). The resupply current I representative of beam current demand is supplied to the D.C. input of high voltage supply 70 (FIG. 1) during the horizontal line retrace interval following each horizontal line trace interval. FIG. 6 illustrates the amplitude response of individual resupply currents associated with each of the horizontal line white image segments 1–16 of FIG. 2, in the absence of circuit 100 according to the present invention. Since each of horizontal image lines 1–16 is of uniform intensity in this example, in such case the resupply currents are of uniform amplitude.

Figure 3:
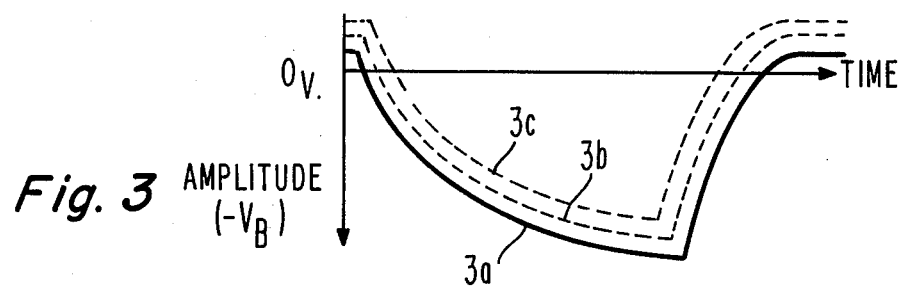
Figure 4:
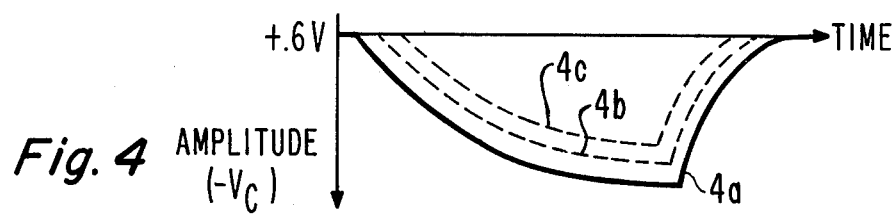
Figure 5:
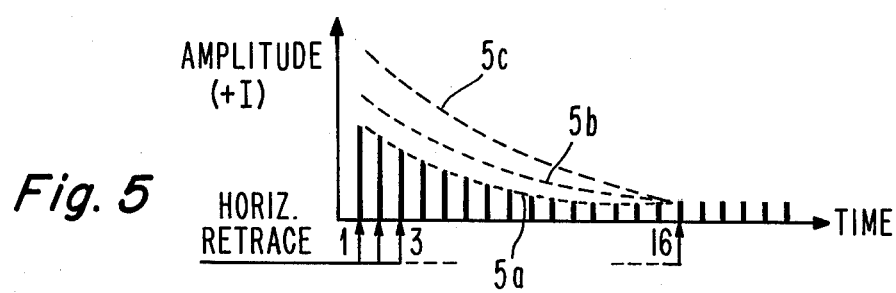

An initial transient, negative-going control voltage $V_B$, produced in response to an initial transient increase in beam current associated with the white image portion (FIG. 2), is shown as waveform 3a in FIG. 3. When of sufficient negative magnitude to render diode 140 conductive and diode 141 non-conductive, the control voltage appears at point C as shown by waveform 4a in FIG. 4. A corresponding voltage waveform appears at the junction of resistors 144 and 150.

The control voltage serves to reduce the electron beam current conduction of kinescope 38 during the time interval associated with horizontal image lines 2–16. As seen from FIG. 5, the resupply currents supplied during this interval exhibit an amplitude response (5a in FIG. 5) corresponding to the amplitude of the control voltage (4a in FIG. 4). In essence, the amplitude response 5a of the resupply currents is representative of the reduced conduction of kinescope 38 in response to the magnitude of the control voltage (4a in FIG. 4).

The amplitude of the horizontal rate resupply currents (5a in FIG. 5) in response to the control voltage (4a in FIG. 4) can cause undesirable gray-scale shading of the otherwise white image portion represented by horizontal image lines 1–16. This effect results since the amplitude of the resupply currents (5a in FIG. 5) respectively associated with successive horizontal image lines (beginning with line 2 in this example) exhibits a progressively decreasing magnitude in accordance with the progressively negatively increasing magnitude of the control voltage (4a in FIG. 4). Accordingly, horizontal lines 1 through 16 appear substantially white through increasing darker shades of gray to black when displayed by kinescope 38. This effect is perceptible to a viewer when the image represented by FIG. 2 persists for a sufficient period of time such as several vertical scanning intervals, for example.

The undesired visible effects of the distorted luminance level represented by the gray-scale shading can be reduced to an acceptable minimum by the operation of the network 137 together with capacitor 136. After the control voltage (4a in FIG. 4) associated with the initial transient increase in beam current is coupled from capacitor 136 to the control grids of kinescope 38, capacitor 136 begins to charge to a more positive level via resistor 138 and voltage source $V_1$. Thus network 137 serves as a source of current in this context. Assuming the white image of FIG. 2 persists for more than one vertical interval, a succeeding control voltage, produced in response to the transient current increase associated with the succeeding vertical interval, will then exhibit a more positive amplitude (3b in FIG. 3, 4b in FIG. 4) due to the increased charge on capacitor 136. The associated amplitude response of the resupply currents consequently increases during this interval (5b in FIG. 5). Additional charge is supplied to capacitor 136 via resistor 138 after this interval, so that the control voltage associated with the next succeeding vertical interval exhibits an even more positive amplitude (3c in FIG. 3, 4c in FIG. 4) due to the additional charge on capacitor 136. The associated amplitude response of the resupply currents consequently further increases during this interval (5c in FIG. 5).

By providing progressively less control voltage to the control grids of kinescope 38 in the presence of successively recurring transient currents, luminance distortion (e.g., gray-scale shading) is less pronounced and less objectionable to a viewer. If the white image portion (FIG. 2) persists for a sufficient length of time, the associated beam current demand of the kinescope will approach a condition of average beam current demand, at which time average beam current limiter 105 will be activated.

It is noted that a vertical image interval containing only a single white image portion causing a transient beam current condition has been described. However, a given vertical image interval can contain more than one such white image portion having an associated control voltage developed by circuit 100. Capacitor 136 and network 137 cooperate as discussed in this case as well. It is also noted that factors determinative of the recharging time constant associated with resistor 138, capacitor 136 and voltage source $V_1$ include the response time of average beam limiter 105 and the rate of recurrence of transient beam currents to be limited by circuit 100. In the latter regard, it is noted that a time constant for recharging capacitor 136, in successive increments in the manner discussed, is determined by the values of resistor 138 and capacitor 136. With the values shown in this example, this time constant is established such that the successive recharging of capacitor 136 is accomplished when the successive control voltages are associated with successive transient currents spaced apart in time less than approximately four vertical scanning time intervals. However, other time constants can be chosen to suit the particular requirements of other arrangements.

Although the invention has been described with reference to a particular embodiment, various additional modifications can be made within the scope of the invention. For example, coupling capacitor 136 can be replaced by a parallel combination of a capacitor and a resistance. Also, control voltage $V_B$ can be applied to luminance signal processing unit 15 instead of to the control grids of kinescope 38 as shown, to reduce the D.C. content of the luminance signal and thereby the conduction of kinescope 38 in accordance with the magnitude of the control voltage.

What is claimed is:

1. In a television system including an image reproducing device for reproducing an image in response to image representative video signals, apparatus comprising:
    means for deriving a signal representative of the magnitude of current drawn by said image reproducing device;
    means coupled to said signal deriving means for providing control impulses representative of transient increases in current of predetermined duration drawn by said image reproducing device;
    means for coupling said control impulses to said image reproducing device for reducing the current conduction of said image reproducing device in accordance with the magnitude of said control impulses; and
    means, coupled to said control impulse providing means and effective when said impulses appear in a recurring sequence for altering the magnitude of successive ones of said coupled control impulses of said sequence in progressive increments.

2. Apparatus according to claim 1, wherein:
    said system includes high voltage supplying means for providing operating potential for said image reproducing device; and
    said signal deriving means is coupled to said high voltage supplying means such that said derived signal is representative of the magnitude of current drawn by said image reproducing device from said high voltage supplying means.

3. Apparatus according to claim 2, wherein:
    said signal deriving means includes a current supply coupled via a current path to an input of said high voltage supplying means; and
    said means for providing said control impulses comprises voltage determining means included in said current path between said current supply and said input of said high voltage supplying means, and A.C. coupling means coupled to said voltage determining means for providing said control impulses at an output thereof.

4. Apparatus according to claim 2, wherein:
    said means for providing said control impulses comprises A.C. coupling means for providing said control impulses at an output thereof.

5. Apparatus according to claim 4, wherein:
said altering means comprises a source of current coupled to said A.C. coupling means.

6. Apparatus according to claim 5, wherein:
said A.C. coupling means comprises charge storage means; and
said source of current is coupled to said charge storage means remote from said coupling to said signal deriving means.

7. Apparatus according to claim 6, wherein:
said source of current comprises a source of potential and resistive current determining means.

8. Apparatus according to claim 2, wherein:
said coupling means includes threshold conduction means for coupling said altered magnitude impulses to said image reproducing device when said impulses exhibit a magnitude in excess of a threshold conduction level of said conduction means.

9. Apparatus according to claim 1, wherein:
said predetermined duration of said transient current drawn by said image reproducing device is less than the duration of a vertical image scanning interval but greater than the duration of a horizontal image scanning interval of said image reproducing device.

10. Apparatus according to claim 9, and further comprising:
means responsive to said derived signal and coupled to said image reproducing device for reducing the conduction thereof in accordance with the magnitude of average current drawn by said image reproducing device.

11. Apparatus according to claim 9, wherein:
said altering means is effective when said successive ones of said coupled control impulses are separated in time within a predetermined range of time.

* * * * *